R. McC. JOHNSTONE.
WINDING MECHANISM.
APPLICATION FILED DEC. 11, 1919.
1,355,106.
Patented Oct. 5, 1920.
6 SHEETS—SHEET 1.
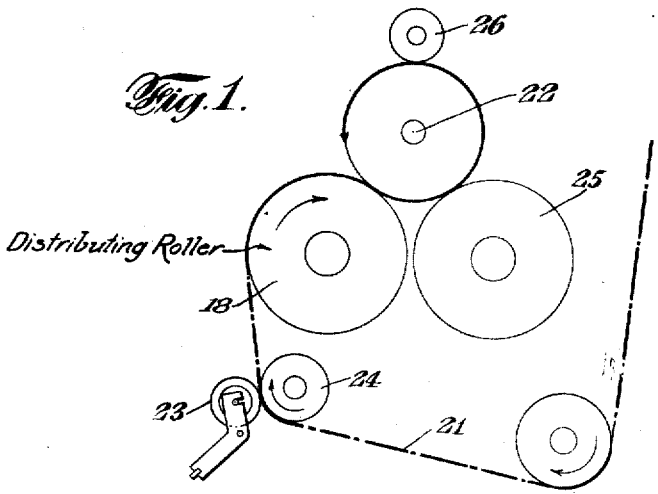
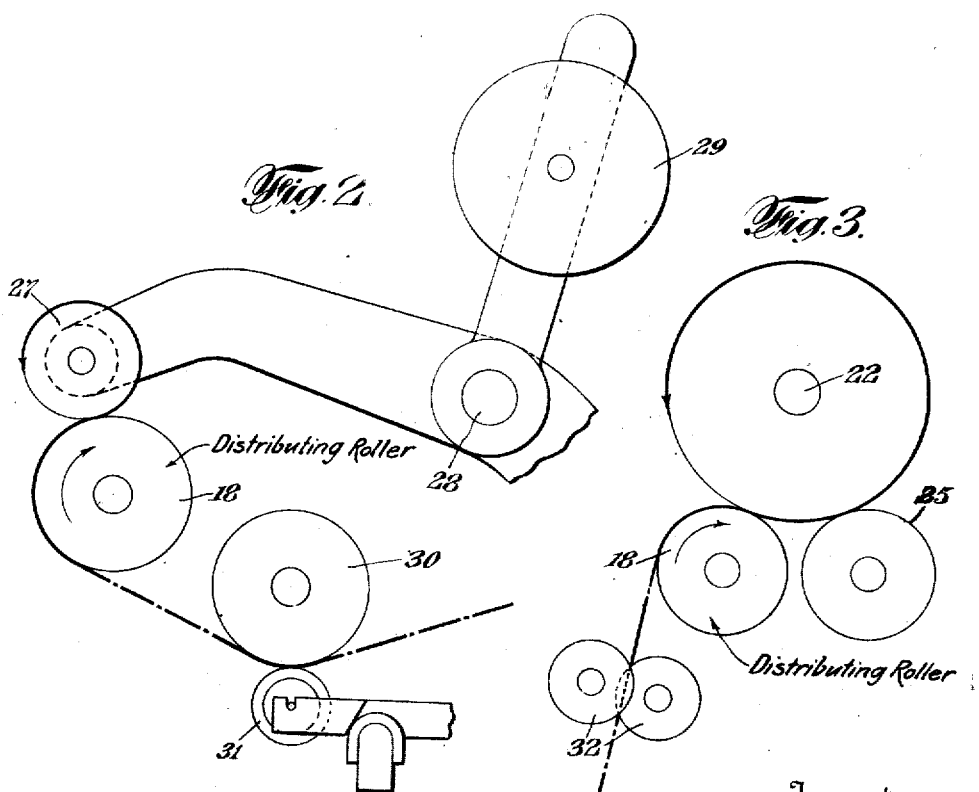
Inventor
Robert Mc.C. Johnstone
By his Attorney

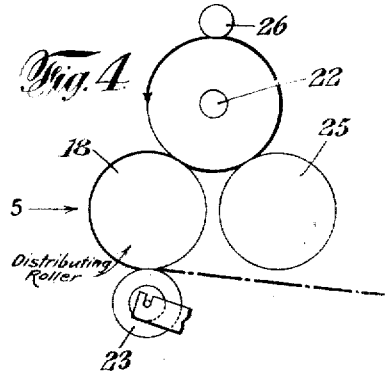
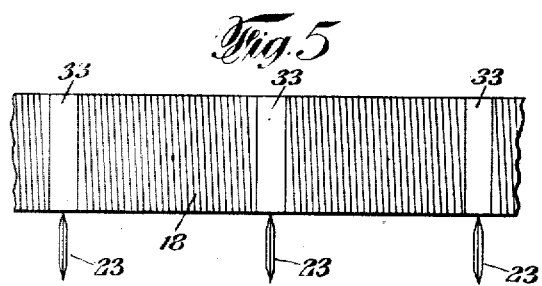
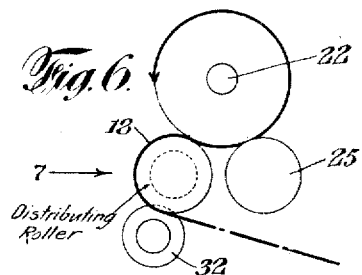
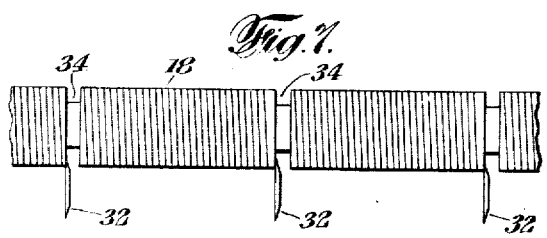
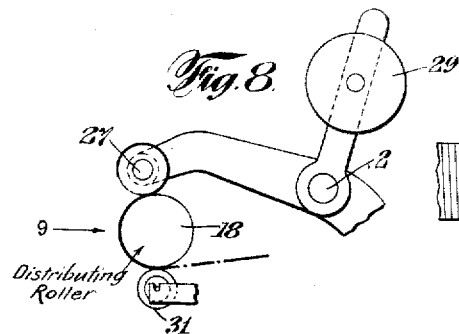
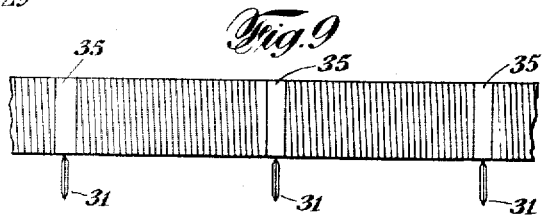
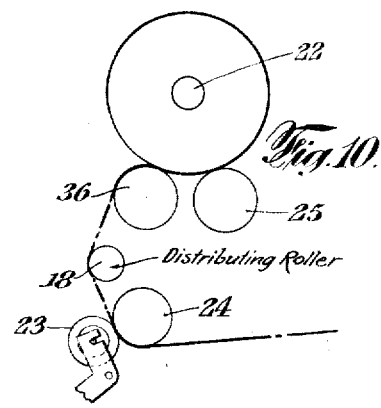
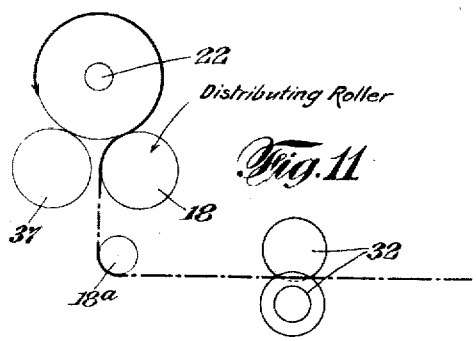

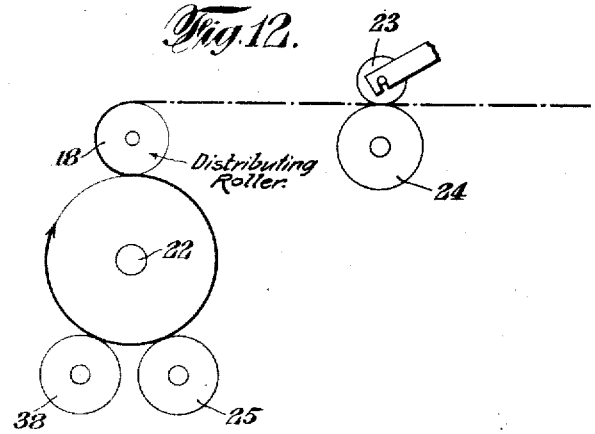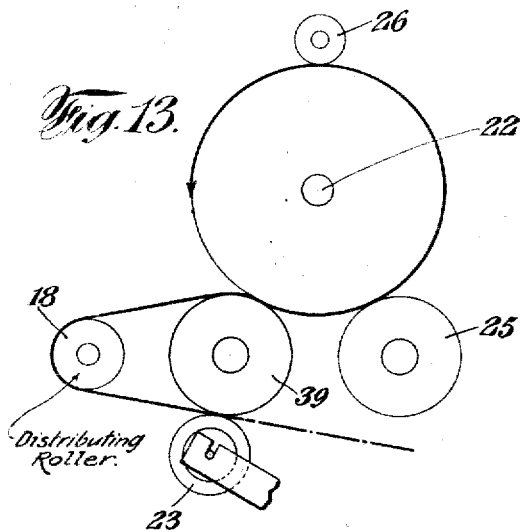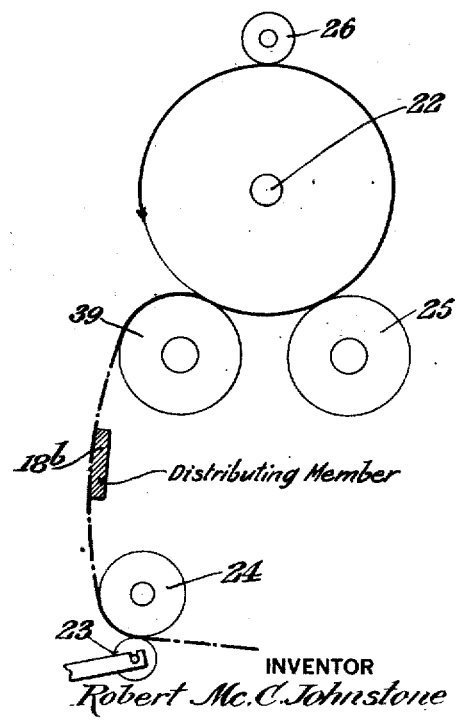

R. McC. JOHNSTONE.
WINDING MECHANISM.
APPLICATION FILED DEC. 11, 1919.
1,355,106.
Patented Oct. 5, 1920.
6 SHEETS—SHEET 4.
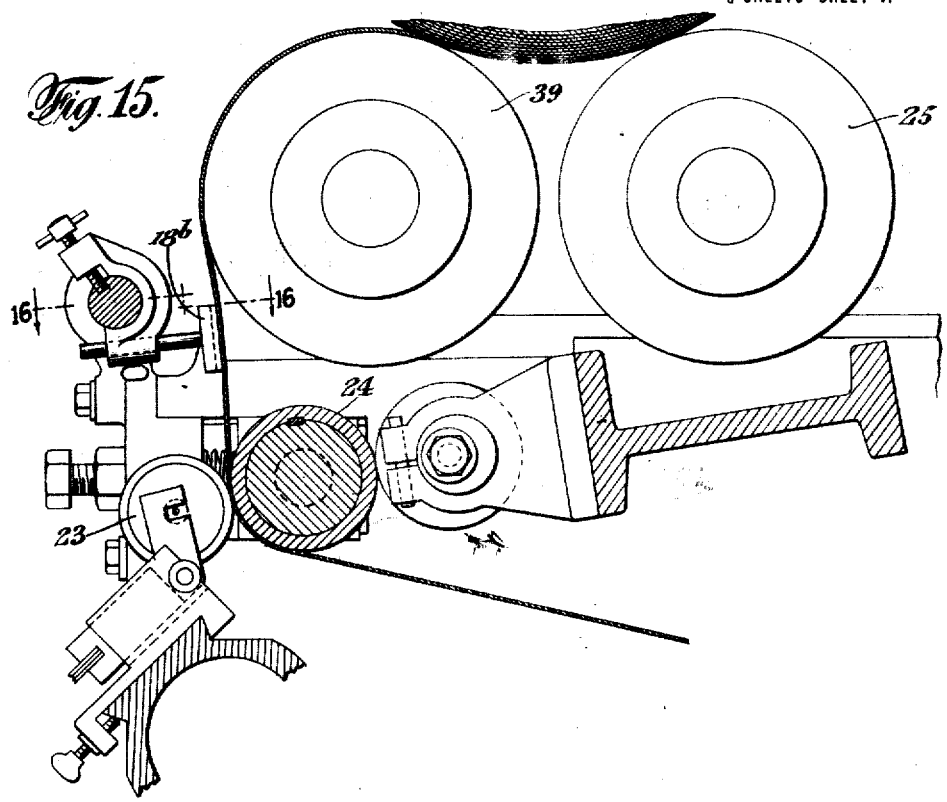
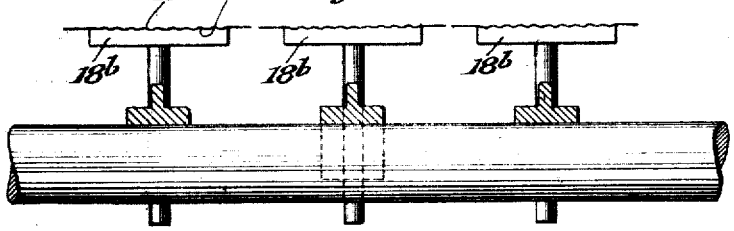
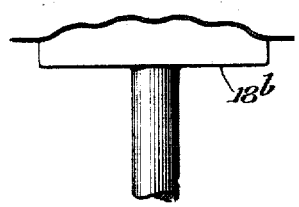
INVENTOR
Robert McC. Johnstone
BY
ATTORNEY

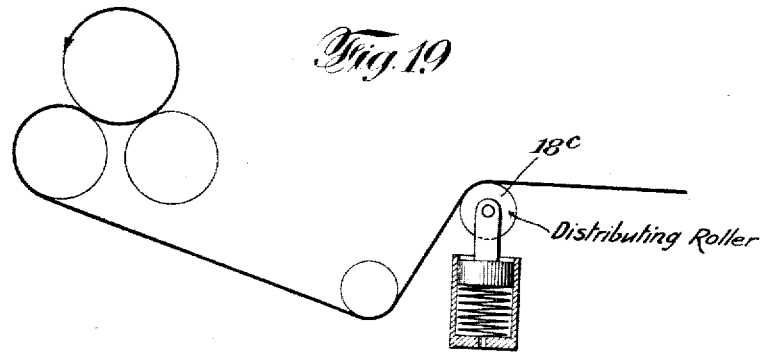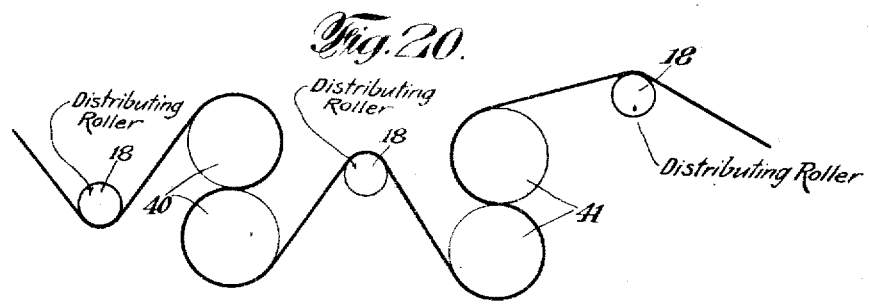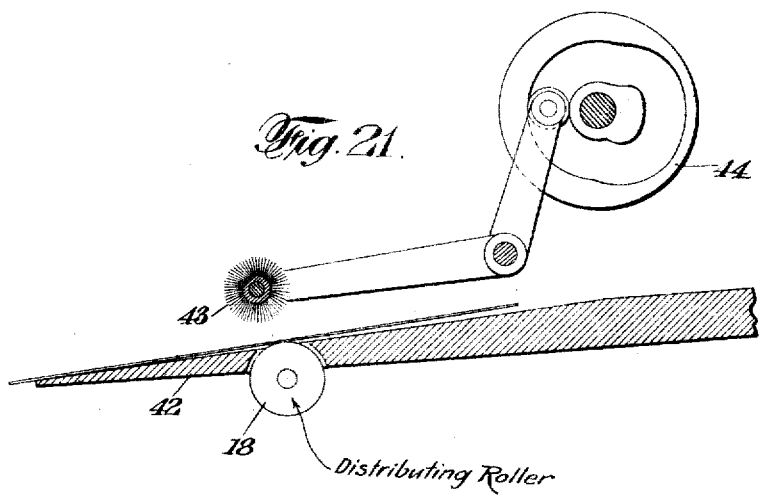

R. McC. JOHNSTONE.
WINDING MECHANISM.
APPLICATION FILED DEC. 11, 1919.
1,355,106.
Patented Oct. 5, 1920.
6 SHEETS—SHEET 6.
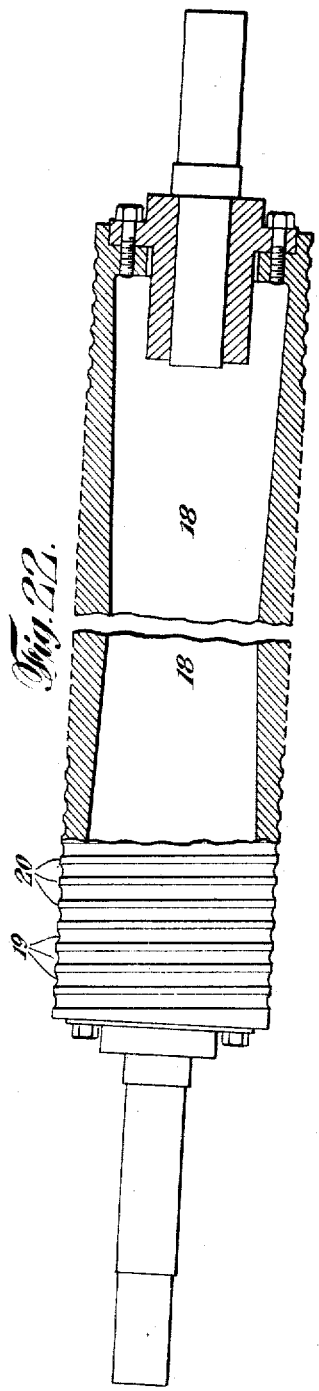
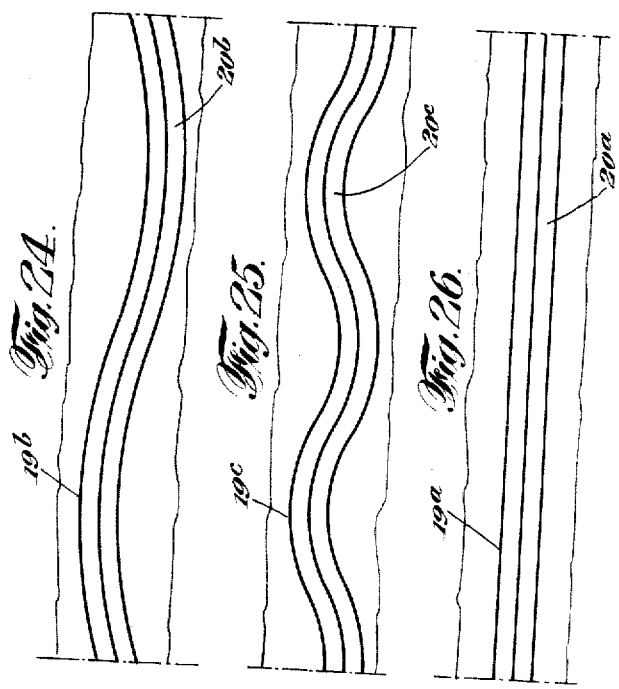
INVENTOR
Robert McC. Johnstone
BY
ATTORNEY

UNITED STATES PATENT OFFICE.

ROBERT McC. JOHNSTONE, OF ROSELLE PARK, NEW JERSEY, ASSIGNOR TO CAMERON MACHINE COMPANY, OF BROOKLYN, NEW YORK, A CORPORATION OF NEW YORK.

WINDING MECHANISM.

1,355,106.         Specification of Letters Patent.         Patented Oct. 5, 1920.

Application filed December 11, 1919. Serial No. 344,256.

*To all whom it may concern:*

Be it known that I, ROBERT McC. JOHNSTONE, a citizen of the United States, and a resident of Roselle Park, in the county of Union and State of New Jersey, have invented certain new and useful Improvements in Winding Mechanism, of which the following is a specification.

The present invention relates generally to a process and device for use in connection with machines for handling flexible materials, such as paper or fabrics, and is capable of a very wide application in the arts as will be apparent from a consideration of what follows:

Among the machines in which the invention can be used are sheet or web feeding devices for printing, folding or cutting machines; paper calendering machines; textile finishing machines; machines for coating or laminating sheets or fabrics; printing machines; rolling up machines; rewinding machines; slitting machines; and slitting and rewinding machines. The foregoing list is not intended to be a limitation as to the machines in connection with which the invention is useful, but is in the nature of an exemplification of the universality of its application.

Paper or fabric passing through machines of the character indicated is subjected to longitudinal stresses that tend to produce therein palpable longitudinal irregularities or wrinkles or to accentuate such irregularities if they already exist. This condition is well known and has generally been associated with the idea of transverse "slack" in the material and, as a consequence, efforts to correct it have been confined to rendering the material "taut" transversely.

In view of the constant longitudinal pull necessarily exerted on the material in machines of this character, it is very difficult to produce a "taut" condition transversely. Furthermore, in slitting and rewinding machines where the web is divided longitudinally into sections and such sections are rewound into side-by-side coils, the effect of rendering the material "taut" transversely is to increase its width and tends to produce an overlapping or interweaving of the edges of adjacent coils thereby rendering it difficult if not impossible to separate them.

The main object of this invention is to nullify the palpable longitudinal irregularities in flexible materials.

I have found that the objectionable palpable irregularities may be distributed into unobjectionable minute undulations that not only free the material from positive defects but also greatly improve its appearance. In addition to this when the invention is used in connection with slitting and rewinding machines, the summation of the minute undulations being greater than the sum of the palpable irregularities, the actual width of the slitted section is slightly decreased and, in consequence, no interweaving or overlapping of the edges of adjacent coils takes place. The distribution of the irregularities is accomplished by producing in the material a plurality of transitory longitudinal deflections from the normal plane of its body, and this may be accomplished by a member, either stationary or rotating, having high and low surfaces to which the material conforms as it travels over the same. Such surfaces may be produced in any suitable manner as by means of protuberances or depressions, but preferably a roller having non-helical valleys and ridges is used.

In the accompanying drawings, the invention is embodied in several concrete and preferred forms in which—

Figure 1 is a diagrammatic view showing the invention applied to a score-cutter and surface rewind machine of the type shown in Patent No. 1,076,189, in which the slitting operation is performed against a roller other than a rewinding roller.

Fig. 2 is a diagrammatic view showing the invention applied to a score-cutter and center rewind machine of the type shown in Patent No. 1,256,499 in which the slitting operation is performed against a roller other than the one engaging the slitted sections during rewinding.

Fig. 3 is a diagrammatic view showing the invention applied to a shear-cutter and surface rewind machine in which the slitting operation is performed by cutters, mounted independently of the surface rewinding rolls.

Fig. 4 is a diagrammatic view showing the invention applied to a score-cutter surface rewind machine in which the cutter acts against one of the rewinding rolls.

Fig. 5 is a view looking in the direction of the arrow 5 in Fig. 4.

Fig. 6 is a diagrammatic view showing the invention applied to a shear-cutter surface rewind machine in which one of the cutting elements constitutes part of the rewinding means.

Fig. 7 is a view looking in the direction of the arrow 7 in Fig. 6.

Fig. 8 is a diagrammatic view showing the invention applied to a center rewind machine in which one of the cutting elements may constitute part of the rewinding means.

Fig. 9 is a view looking in the direction of the arrow 9 in Fig. 8.

Fig. 10 is a diagrammatic view showing the invention applied to a score-cutter surface rewind machine in which a guide member is interposed between the slitting and rewinding means.

Fig. 11 is a diagrammatic view showing the invention applied to a surface rewind machine in which the web is threaded between the rewinding drums and against the back winding drum.

Fig. 12 is a diagrammatic view showing the invention applied to a surface rewind machine in which the web is threaded between the top rewinding roller and rewinding shaft.

Fig. 13 is a diagrammatic view showing a score-cutter and surface rewind machine in which the material is slitted on the first rewinding drum, is then led away therefrom and then returned between the first rewinding drum and the rewinding shaft.

Fig. 14 is a diagrammatic view showing a score-cutter and surface rewind machine in which a distributing member other than a roller is employed.

Fig. 15 is a view similar to Fig. 14 but more in detail and partly in section.

Fig. 16 is a sectional detail view on the line 16—16 of Fig. 15.

Fig. 17 is a detail view of a modified form of a distributing member shown in Figs. 15 and 16.

Fig. 18 is a face view of a still further modified form of the distributing member.

Fig. 19 is a diagrammatic view showing a winding machine associated with a dandy roll that also acts as a distributing roller in passing the paper from the reels of a paper-making machine to the winding machine.

Fig. 20 is a diagrammatic view showing the invention applied either to a printing machine or to calendering rolls.

Fig. 21 is a diagrammatic view showing the invention applied to a sheet feeding machine.

Fig. 22 is a view partly in elevation, broken away, and partly in section of a separating roller embodying the invention.

Fig. 23 is a fragmentary sectional view longitudinally through the separating roller.

Figs. 24, 25 and 26 are diagrammatic views showing developments of different forms of circumferential grooves that may be used in the separating roller.

The invention may best be understood by first considering Figs. 22 to 26. 18 indicates a roller of any suitable construction, the surface of which is provided with circumferential grooves or valleys 19 between which are normal portions or hills 20. These grooves and hills may extend over the entire surface of the roller or only part way. In practice, I have produced excellent results by using a roller fourteen inches in diameter, having valleys eleven-sixteenths of an inch wide and one-thirty second of an inch deep and having hills seven-sixteenths of an inch wide. I do not wish, however, to be restricted to these dimensions. The surface of the roller is highly polished and the valleys and hills merge into each other without pronounced separating edges as indicated in Figs. 22 and 23. The grooves are very shallow and may be of many different shapes. As indicated in Fig. 26, adjacent valleys $19^a$ and hills $20^a$ run straight circumferentially. In Fig. 24, the valleys $19^b$ and hills $20^b$ extend circumferentially and sinuously, but not helically, around the roller; that is to say, one groove does not merge into another and the formation is therefore unlike that of a screw thread. In Fig. 25, the sinuous character of the valleys $19^c$ and hills $20^c$ is more pronounced than in Fig. 24.

If flexible material is now passed, while under tension, over a roller like 18, said material will conform to the surface of the roller and will thus have produced on its surface numerous transitory longitudinal deflections from the normal plane of the body of the material. This will not remove the transverse slack or render the material taut transversely, but it will have a very remarkable effect in distributing the slack into what may be termed minute undulations that are unobjectionable, thereby nullifying palpable longitudinal wrinkles and also improving the appearance of the paper to a considerable degree. It will be understood also that since numerous undulations are formed, the paper will be more slack transversely than it will be when a few pronounced irregularities exist, unless they be of unusual amplitude, so that the width of the paper will be slightly decreased. Therefore, when this invention is used in connection with slitting and rewinding machines, the slitted sections will separate sufficiently to prevent interweaving of the edges of adjacent sections. The straight valleys and hills shown in Fig. 26 may be used with advantage when rewinding material such as cloth; they are not so advantageous when rewinding paper because it is so easily marked. By using the groove formations shown in Figs. 24 and 25, however, paper can be rewound without leaving any mark.

The machines to which the invention is applicable vary widely, and the numerous types of machines indicated in the drawings are not to be construed as limiting the invention to the types disclosed.

In Fig. 1, distributing or separating roller 18 constitutes the first rewinding drum of a surface rewind machine. It will be seen here that the web 21 is wrapped around the roller for considerable distance and that rewinding on shaft 22 takes place immediately after deflection of the material has occured. Excellent results have been obtained with this construction. In this example of the invention, the web is slitted by score-cutter 23 acting against glass-hard cutter roller 24 and the slitted sections are then passed to the distributing and rewinding roller 18. In this figure, 25 is a back rewinding drum and 26 a top pressure or top rewinding roller.

In Fig. 2, distributing roller 18 may also form a part of the rewinding mechanism. The type of machine shown here is generally referred to as a center rewind machine; and 27 is a driven rewinding shaft pivotally mounted at 28 and counterweighted to sustain part, or the entire weight, of the rewound material on shaft 27. The rewound material on 27 may or may not rest on roller 18. Slitting here takes place by means of cutting roll 30 and score-cutter 31.

The construction shown in Fig. 3 is substantially like that shown in Fig. 1 except that overlapping shear-cutters 32 are used instead of score cutters.

In Figs. 4 and 5, we have substantially the same construction as shown in Fig. 1, except that the score-cutter 23 acts against roller 18 which thus acts as a cutting, distributing and rewinding roller. In order to effect this, smooth surfaces as 33 are formed in grooved roller 18 at the places where cutters 23 are in contact with it.

In Figs. 6 and 7, there is shown substantially the same construction as in Fig. 3 except that distributing or separating roller 18 is not only a part of the rewinding means but also constitutes one of the shear cutters, being to that end provided with cutter grooves 34 in which engage overlapping shears 32.

In Figs. 8 and 9 is shown substantially the same construction as in Fig. 2 except that score-cutter 31 acts against distributing roller 18, which latter to that end is provided with smooth hardened cutting surfaces 35.

In Fig. 10 is shown substantially the same construction as in Figs. 1 and 4 except that distributing roller 18 is neither a cutting roller nor a rewinding roller. The web is here led to cutters 23 and 24, then to distributing roller 18 and then to first rewinding roller 36, back rewinding drum 25 and rewinding shaft 22.

In Fig. 11 is shown a rewinding shaft 22 and a front rewinding drum 37, roller 18 constituting the back rewinding drum. The slitting means are here illustrated as shear cutters 32 from which the web passes to guide roller 18ª and thence between the rewinding drums to the rewinding shaft. If desired, guide roller 18ª could be a distributing roller and 18 could then be merely a back winding drum.

In Fig. 12 is shown a construction substantially the same as in Fig. 1 except that here the web after being slitted is passed to distributing roller 18 constituting a top pressure or rewinding roller and thence to rewinding shaft 22 with which coöperate front and back rewinding drums 38 and 25.

In Fig. 13 is shown a construction substantially the same as in Fig. 4 except that cutter 23 acts against the front rewinding drum 39, the paper after being slitted passing over distributing drum 18 and then back between front rewinding drum and rewinding shaft.

In Fig. 14 is shown substantially the same construction as in Fig. 1 except that here the distributing member 18ᵇ is a stationary member and not a roller. This construction is shown more in detail in Figs. 15 and 16 from which it appears that the paper after being slitted passes over a number of members 18ᵇ, there being preferably a member for each section. The face of each of these members has hills 19ᵈ and valleys 19ᵉ in its surface, the axis of each hill and valley being in the same direction as the longitudinal travel of the web. The contour of said member 18ᵇ may, however, vary widely and may be curved transversely as shown in Fig. 17 or, as shown in the face view Fig. 18, the hills and valleys may be plow-shaped or have other suitable configuration.

In Fig. 19 roller 18ᶜ may be a dandy roller such as is interposed between the reels of a paper-making machine (not shown) and a winder. This dandy roller, as is well known, is usually spring-seated at one or both ends, as shown, to adjust the paper to a right angle direction with respect to the axis of the rolls of the winding machine. If the winding machine also performs the function of slitting, then a construction similar to the one shown in Fig. 1 could be used and an additional distributing roller would then be employed after the paper is slitted. It may be remarked here that when the paper is slitted the sections are usually clearly separated, but the moment the slitted sections strike an even surface the sections tend to approach each other and to interweave. It is therefore preferred, when using the invention in a slitting machine, to have the distributing roller so located that it is the first surface after slitting, and the last surface before rewinding that the sections engage.

In Fig. 20 is shown diagrammatically two sets of cylinders 40 and 41 which may represent the cylinders of a printing machine or which may represent the rolls of a calendering machine. To distribute palpable wrinkles one or more distributing rollers 18 may be employed and the paper led over them. The arrangement of rollers 18 shown in the figure is for a calendering machine. In printing machines of a certain type probably only one roller 18 would be used, and that before the paper enters the first set of cylinders, since otherwise the register between the first and second printing might be destroyed.

In Fig. 21 a driven distributing roller 18 is located in a feed board 42 over which a sheet passes. A drop roller 43, actuated by a cam 44, descends into contact with the sheet and presses it against the distributing roller and thus nullifies the wrinkles as it feeds the sheet forward.

I claim:

1. The method of nullifying longitudinal irregularities in flexible material which consists in distributing said irregularities into minute longitudinal undulations by producing transitory longitudinal deflections in said material.

2. The method of preventing overlapping of the edges of adjacent rewound coils formed from sections of flexible material which consists in forming minute longitudinal undulations in each of said sections by producing transitory longitudinal deflections in said material.

3. The method of decreasing the width of slitted sections of flexible material which consists in forming minute longitudinal undulations in each of said sections by producing transitory longitudinal deflections in said material.

4. The method of nullifying transverse slack in flexible material which consists in distributing such slack into minute longitudinal undulations by producing transitory longitudinal deflections in said material.

5. A winding machine comprising: means for winding web sections into side by side coils, and separating means for preventing interweaving of adjacent wound coils consisting of a device for producing in each section a plurality of transitory longitudinal deflections from the normal plane of the body of the individual sections.

6. A winding machine comprising: means for winding web sections into side by side coils, and separating means for preventing interweaving of adjacent wound coils consisting of a roller for producing in each section a plurality of transitory longitudinal deflections from the normal plane of the body of the individual sections.

7. A winding machine comprising: means for winding web sections into side by side coils, and separating means for preventing interweaving of adjacent wound coils consisting of a roller constituting a part of the winding means for producing in each section a plurality of transitory longitudinal deflections from the normal plane of the body of the individual sections.

8. A winding machine comprising: means for winding web sections into side by side coils, and separating means for preventing interweaving of adjacent wound coils consisting of a device having grooves in its surface extending in the general direction of the travel of the sections and over which said sections pass.

9. A winding machine comprising: means for winding web sections into side by side coils, and a separating means for preventing interweaving of adjacent wound coils consisting of a roller having circumferential grooves in its surface over which said sections pass.

10. A winding machine comprising: means for winding web sections into side by side coils, and a separating means for preventing interweaving of adjacent wound coils consisting of a roller, constituting a part of the winding means, having circumferential grooves in its surface and over which said sections pass.

11. A winding machine comprising: means for winding web sections into side by side coils including a plurality of surface winding rolls, that surface winding roll with which the paper first engages having circumferential grooves in its surface that engage the body of the sections.

12. Means for decreasing the width of sections of flexible material to be wound comprising: a roller having a plurality of shallow circumferential grooves in its surface to which the body of the sections conform as they travel over the same.

13. Means for decreasing the width of sections of flexible material to be wound comprising: a roller having a plurality of shallow non-helical circumferential grooves in its surface to which the body of the sections conform as they travel over the same.

14. A separating roller, for use in separating slitted sections to be rewound, having a polished surface and for each slitted section a plurality of circumferential grooves in its surface to which the body of each section conforms as it travels over the same.

15. A separating device, for use in separating slitted sections to be rewound side by side, having a plurality of grooves in its surface extending in the general direction of the travel of the sections, to which the body of each section conforms as it travels over the same.

16. A separating device, for use in separating slitted sections to be rewound side by side, having a plurality of sinuous grooves in its surface extending in the general direction of the travel of the sections, to which the body of each section conforms as it travels over the same.

Signed at Brooklyn, in the county of Kings, and State of New York, this 9 day of December, 1919.

ROBERT McC. JOHNSTONE.